US011413748B2

(12) United States Patent
Colasanto et al.

(10) Patent No.: US 11,413,748 B2
(45) Date of Patent: Aug. 16, 2022

(54) SYSTEM AND METHOD OF DIRECT TEACHING A ROBOT

(71) Applicants: Robert Bosch GmbH, Stuttgart (DE);
Luca Colasanto, Boston, MA (US);
Juergen Hess, Sunnyvale, CA (US)

(72) Inventors: Luca Colasanto, Boston, MA (US);
Juergen Hess, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 60 days.

(21) Appl. No.: 16/627,080

(22) PCT Filed: Aug. 9, 2018

(86) PCT No.: PCT/US2018/045984
§ 371 (c)(1),
(2) Date: Dec. 27, 2019

(87) PCT Pub. No.: WO2019/032814
PCT Pub. Date: Feb. 14, 2019

(65) Prior Publication Data
US 2020/0130178 A1    Apr. 30, 2020

Related U.S. Application Data

(60) Provisional application No. 62/543,652, filed on Aug. 10, 2017, provisional application No. 62/545,020, filed on Aug. 14, 2017.

(51) Int. Cl.
*B25J 9/16* (2006.01)
*G05B 19/4155* (2006.01)

(52) U.S. Cl.
CPC ......... *B25J 9/163* (2013.01); *G05B 19/4155* (2013.01); *G05B 2219/39451* (2013.01)

(58) Field of Classification Search
CPC ........... G05B 2219/40131; G05B 2219/39451; G05B 2219/35444; G05B 2219/35464; G05B 2219/40122
See application file for complete search history.

(56) References Cited

U.S. PATENT DOCUMENTS 5,803,738 A * 9/1998 Latham .................. B25J 9/1656
345/157
7,787,992 B2 * 8/2010 Pretlove .................. G06F 3/011
700/259

(Continued)

FOREIGN PATENT DOCUMENTS

DE    10 2015 015 503 A1    6/2016
JP           4-210390 A        7/1992

(Continued)

OTHER PUBLICATIONS

International Search Report and Written Opinion corresponding to PCT Application No. PCT/US2018/045984, dated Nov. 22, 2018 (16 pages).

(Continued)

*Primary Examiner* — Ryan Rink
(74) *Attorney, Agent, or Firm* — Maginot, Moore & Beck LLP

(57) ABSTRACT

A system for teaching a robot includes a wearable device having a plurality of sensors for sensing signals representing at least one movement, orientation, position, force, and torque of any part of a user's body applied on a target. The system further includes a processing device configured to receive the sensed signals, the processing device further configured to store the sensed signals defining as data of teaching commands, a controller for controlling a robot receives the data of teaching commands and operates the robot according to the received data of teaching commands, an object sensor to detect position and orientation of an (Continued)

object as a workpiece of the robot, and a visual input device communicatively coupled to at least one of the processing device and the controller.

20 Claims, 11 Drawing Sheets

(56) References Cited

U.S. PATENT DOCUMENTS

| | | | |
|---|---|---|---|
| 9,092,698 B2 | 7/2015 | Buehler et al. | |
| 9,643,314 B2 | 5/2017 | Guerin et al. | |
| 2002/0133264 A1 | 9/2002 | Maiteh et al. | |
| 2007/0078564 A1* | 4/2007 | Hoshino | B25J 15/0009 700/245 |
| 2010/0082118 A1* | 4/2010 | McGreevy | G05B 19/4183 700/17 |
| 2013/0073092 A1 | 3/2013 | Hosek | |
| 2013/0211592 A1 | 8/2013 | Kim | |
| 2013/0345870 A1* | 12/2013 | Buehler | B25J 9/1671 700/257 |
| 2013/0345875 A1* | 12/2013 | Brooks | G06V 10/235 700/258 |
| 2014/0371906 A1* | 12/2014 | Barajas | B25J 13/02 700/257 |
| 2016/0158937 A1* | 6/2016 | Kamoi | B25J 9/1671 901/5 |
| 2017/0165841 A1 | 6/2017 | Kamoi | |
| 2017/0190052 A1* | 7/2017 | Jaekel | G06N 20/00 |
| 2017/0249561 A1* | 8/2017 | Abdallah | G06N 20/00 |
| 2017/0259428 A1* | 9/2017 | Assad | G16H 40/67 |
| 2018/0017461 A1* | 1/2018 | Arai | G01M 1/122 |
| 2018/0281172 A1* | 10/2018 | Inaba | B25J 19/06 |
| 2018/0345491 A1* | 12/2018 | Iwamoto | B25J 9/1656 |
| 2019/0291277 A1* | 9/2019 | Oleynik | B25J 9/1669 |
| 2020/0230803 A1* | 7/2020 | Yamashita | B25J 18/00 |

FOREIGN PATENT DOCUMENTS

| | | |
|---|---|---|
| JP | 8-257948 A | 10/1996 |
| KR | 10-1343860 B1 | 12/2013 |

OTHER PUBLICATIONS

Thorstensen, Visualization of Robotic Sensor Data with Augmented Reality, Improving the observer's understanding, 2017 (105 pages).

Fung et al., An Augmented Reality System for Teaching Sequential Tasks to a Household Robot, 2011 (6 pages).

Pérez-D'Arpino et al., C-LEARN: Learning Geometric Constraints from Demonstrations for Multi-Step Manipulation in Shared Autonomy, 2017 (8 pages).

Yang et al., Robot Learning Manipulation Action Plans by "Watching" Unconstrained Videos from the World Wide Web, 2015 (7 pages).

* cited by examiner

SYSTEM AND METHOD OF DIRECT TEACHING A ROBOT

CROSS-REFERENCE TO RELATED APPLICATIONS

This application is a 35 U.S.C. § 371 National Stage Application of PCT/US2018/045984, filed on Aug. 9, 2018, which claims priority to (i) U.S. Provisional Application Ser. No. 62/543,652 entitled "SYSTEM AND METHOD OF DIRECT TEACHING A ROBOT" by Colasanto et al., filed Aug. 10, 2017, and (ii) U.S. Provisional Application Ser. No. 62/545,020 entitled "SYSTEM AND METHOD OF DIRECT TEACHING A ROBOT" by Colasanto et al., filed Aug. 14, 2017, the disclosures of which are hereby incorporated herein by reference in their entireties.

TECHNICAL FIELD

This disclosure relates generally to teaching systems and, more particularly, to system and method of direct teaching a robot.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to systems and methods for teaching a robot. One such system may include a wearable device having a plurality of sensors for sensing signals representing at least one movement, orientation, position, force, and torque of any part of a user's body applied on a target. The system further includes a processing device configured to receive the sensed signals, the processing device further configured to store the sensed signals defining as data of teaching commands, a controller for controlling a robot receives the data of teaching commands and operates the robot according to the received data of teaching commands, an object sensor to detect position and orientation of an object as a workpiece of the robot, and a visual input device communicatively coupled to at least one of the processing device and the controller, wherein the visual input device configured to generate a visual view to the user a task performed by the robot in relation to the object, and visually correct the robot during operation of the robot and override the data of teaching commands received by controller. The controller is configured to receive the detected position and orientation of the object and operates the robot to perform an operation according to the data of teaching commands including at least one of shifting, moving, rising, and lowering the robot closer to the object. The visual input device enables visualization of learning result during operation of the robot. The processing device enables data transfer between any of the wearable device, the object sensor, visual input device, and the controller. The wearable device is a glove, a wrist device, a watch or a ring. The visual input device is a contact lens, a glasses, a goggle, or a head-mounted display. The sensed signals defined as data of teaching commands are stored on at least one of a computer readable medium and a cloud database. The data of teaching commands is selected from a group consisting of an end-effector motion, a grasping motion, strength of grasp, an approaching motion to the object, a lifting motion, a holding motion, a throwing motion, and a waving motion. Examples of sensors are motion sensing, position sensing, magnetic sensing, accelerometers, gyroscopes, global positioning (GPS), inertial sensing, or force sensing.

According to another aspect of the disclosure, the system for teaching a robot includes an input assembly having a plurality of sensors for sensing analog signals representing at least one movement, orientation, position, force, and torque of any part of a user's body applied on a target, and visualizing of learning result during operation of the robot. The system further includes a processing device configured to receive the sensed signals, the processing device further configured to store the sensed signals defining as data of teaching commands and a controller receives the data of teaching commands and operates the robot according to the received data of teaching commands, wherein the input assembly configured to visually correct the robot during operation of the robot and override the data of teaching commands received by the controller. An object sensor configured to detect position and orientation of an object as a workpiece of the robot to the system. The controller receives the detected position and orientation of the object and operates the robot to perform an operation according to the data of teaching commands including at least one of shifting, moving, rising, and lowering the robot closer to the object. The processing device enables data transfer between any of the input assembly, the object sensor, and the controller. The input assembly includes a wearable device having a plurality of sensors for sensing analog signals representing at least one movement, orientation, position, force, and torque of part of the user's body applied on a target, and a visual input device configured to enable visualization of learning result and visually correcting the robot during operation of the robot. The wearable device is a glove, a wrist device, a watch, or a ring. The visual input device is a contact lens, a glass, a goggle, or a head-worn display.

According to yet another aspect of the disclosure, a method of teaching a robot includes sensing, by an input device, analog signals representing at least one movement, orientation, position, force, and torque of any part of a user's body applied on a target, receiving the sensed signals by a processor, storing the sensed signals defining as data of teaching commands on a non-transitory computer-readable storage media, and controlling a robot by a controller. The controller receives the data of teaching commands and operates the robot according to the received data of teaching commands whereas the input device visually corrects the robot and overrides the data of teaching commands received by controller during operation of the robot. The method further includes detecting position and orientation of an object as a workpiece of the robot, wherein receiving the detected position and orientation of the object by the controller and operating the robot to perform an operation according to the data of teaching commands. The method further includes comprising enabling visualization of learning result by the input device during operation of the robot.

According to further yet another aspect of the disclosure, a system of teaching a robot includes one or more processors, a memory, and one or more programs, wherein the one or more programs are stored in the memory and configured to be executed by the one or more processors, the one or more programs includes: instructions for detecting signals representing at least one movement, orientation, position, force, and torque of any part of a user's body with a wearable device, instructions for processing the detected signals, instructions for storing the processed signals defining as data of teaching commands, instructions for operating the robot according to the data of teaching commands, and instructions for visually correcting the robot during operation of the robot. The system further includes instructions for visualizing learning result and overriding the data of teaching commands received by the controller during the operation of the robot.

According to another aspect of the disclosure, a computer readable storage medium having stored therein instructions, which when executed by a device for teaching a robot, cause the device to: detect signals representing at least one movement, orientation, position, force, and torque of any part of a user's body with a wearable device, process the detected signals defining as data of teaching commands, operate the robot according to the data of teaching commands, and visually correct the robot during operation of the robot. The computer readable storage medium further include instructions that cause the device to visualize learning result during operation of the robot, wherein operate the robot according to the data of teaching commands including based on position and orientation of an object as a workpiece of the robot detected by an object sensor and either shift, move, raise, or lower the robot closer to the object in order to perform an operation according to the data of teaching commands.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

Figure 1A:
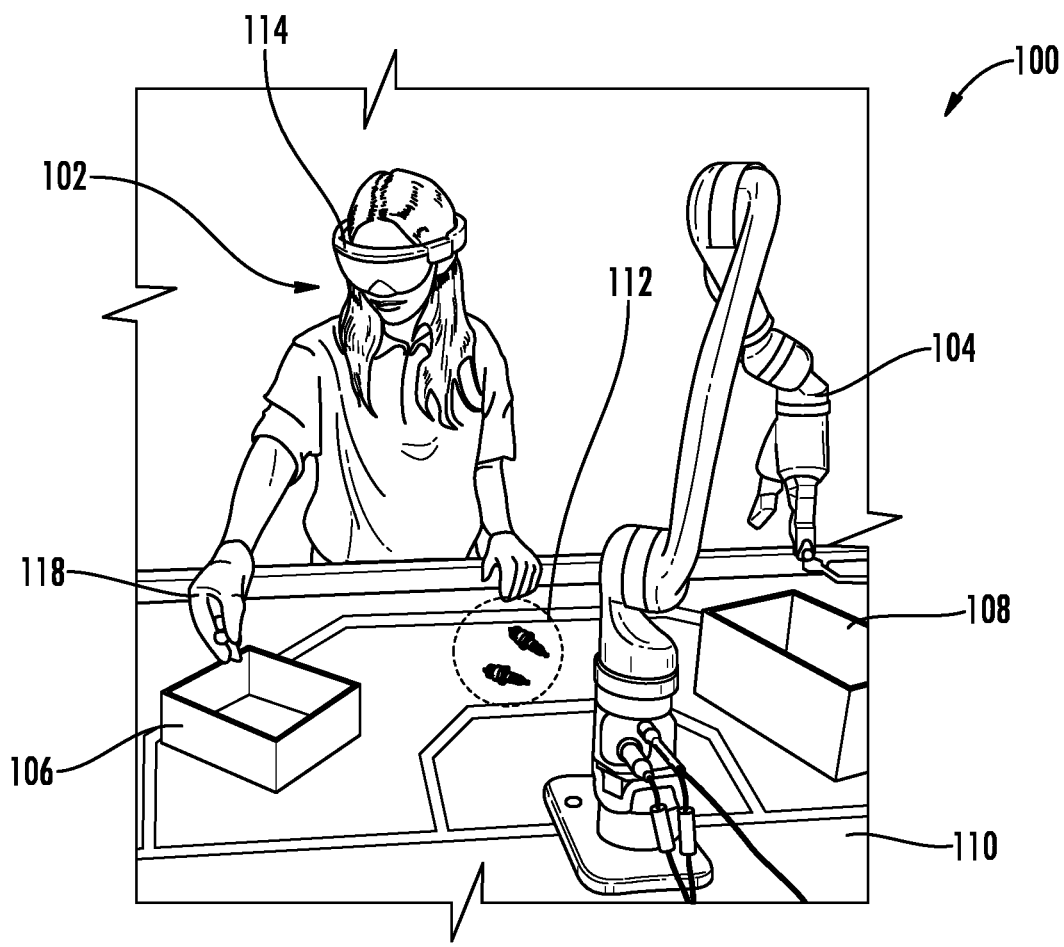
FIG. 1A is a perspective view of a teaching system implemented on an operator-robot environment according to an embodiment of the disclosure.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

FIG. 1A illustrates a perspective view of a teaching system implemented on an operator-robot environment 100 according to an embodiment of the disclosure. In the environment 100, there are an operator or a user 102 and a robot 104. A wearable computer or device 118 worn by the operator 102 is configured to track or detect movement, orientation, position, force, torque, or combination thereof of a body or a part of the body, such as arm, a hand, a finger, or a palm of the operator 102. In one example, the wearable computer or device 118 includes a plurality of elements for tracking or detecting analog signals representing at least one movement, orientation, position, force, or torque of the body or a part of the body, such as arm, a hand, a finger, or a palm of the operator 102. In another example, the wearable computer or device 118 includes a plurality of elements for sensing analog signals representing at least one movement, orientation, position, force, or torque of the body or a part of the body, such as arm, a hand, a finger, or a palm of the operator 102. The wearable computer or device 118 may be a glove, a wrist device, a watch, or a ring. A vision-based computer 114 worn by the operator 102 may be provided to visualize learning result either before, during, or after the operation of the robot 104. The vision-based computer 114 may be is a contact lens, a glasses, a goggle, or a head-mounted display worn by the operator 102. In some embodiments, the vision-based computer 114 is a vision-based augmented reality (AR) computer configured to visualize learning result, override teaching commands received by a controller, and visually correct the operation of the robot. The operator 102 uses his or her finger, hand, arm, or palm with the wearable computer or device 104 thereon for teaching the robot how to process an object 112 on a base or surface 114 of a counter-top, table, or the like. As illustrated, as one example, the operator 102 picks up one or more objects 112 sitting on the surface 114 and places the object(s) 112 into a vessel 106, 108 such as a box or a container. In another alternate example, the operator 102 picks up one or more objects 112 found or contained inside the vessel 106, 108 and places the object(s) 112 on the surface 114. The elements of the wearable computer or device 118 either senses or tracks movement, orientation, position, force, or torque of the arm, the hand, the finger, or the palm of the operator 102. The sensed or tracked signals representing any movement, orientation, position, force, or torque are processed and stored as data of teaching commands. One or more processors directly or indirectly coupled to the wearable device 118 receives the sensed or tracked information or signals for processing before the sensed or tracked information is transmitted or forwarded to a non-transitory computer-readable storage media or machine-readable medium for storage. In another embodiment, the wearable device 118 includes the processor for processing the sensed or tracked information. Depending on certain applications, a partial task, a single task, or multiple task including the sensed/tracked information may be transmitted or forwarded to one or more processors for processing. In one embodiment, the non-transitory computer-readable storage media or machine-readable medium for storage may be a cloud database, a local database, a storage unit on the wearable device 118, a storage unit, a database on a thin client such as a personal device, a mobile device, a phablet, a tablet, a personal digital assistant (PDA), a laptop, a portable device, a wrist-worn device, a body-worn device, or any suitable device capable of storing the processed information defined as data of teaching commands. Examples of sensing or tracking elements for determining the movement, orientation, position, force, or torque are motion sensing, position sensing, magnetic sensing, accelerometers, gyroscopes, global positioning system (GPS), inertial sensing, pressure sensing, or any suitable sensing and tracking technologies. Communication of the information from the wearable device 118 to at least one of the processor or the non-transitory computer-readable storage media is done through a wired or wireless link.

Figure 1B:
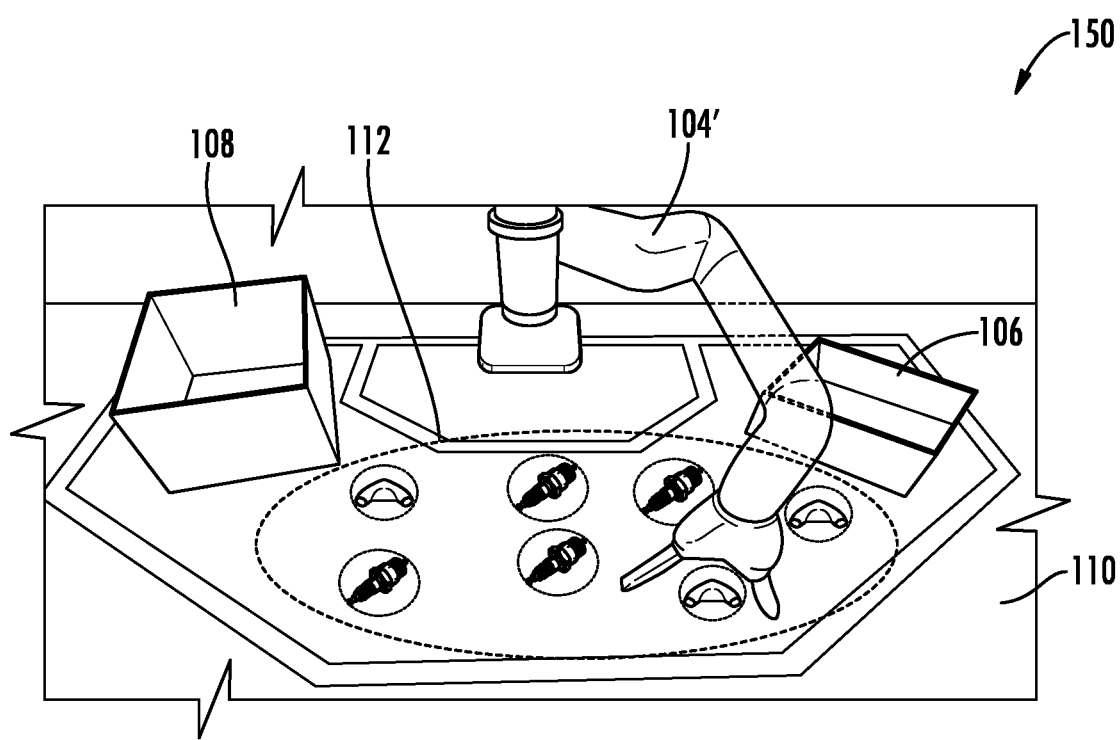
FIG. 1B is an example of an augmented reality view showing the teaching system of FIG. 1A.

FIG. 1B illustrates an example of an augmented reality view 150 showing learning result generated by a vision-based computer 114 combining the implementation of using the teaching system of FIG. 1A. The operator 102 wears the vision-based augmented reality (AR) computer 114 and sees the real world including movement, orientation, position, force, or torque of the body or a part of the body combined with computer generated graphics representing, for example, the robot 104' and a learning result. The learning result once visualized, the vision-based AR computer 114 can either verify the accuracy of the learning result. The vision-based AR computer 114 causes the controller to either do nothing to the robot 104' or alter/correct/change the control or operation of the robot 104'. In this illustration, the learning result is consistent with the teaching sequence performed by the operator 102 is verified via the vision-based AR computer 114 worn by the operator 102. Details of the teaching system may be further described in the following figure(s).

Figure 2A:
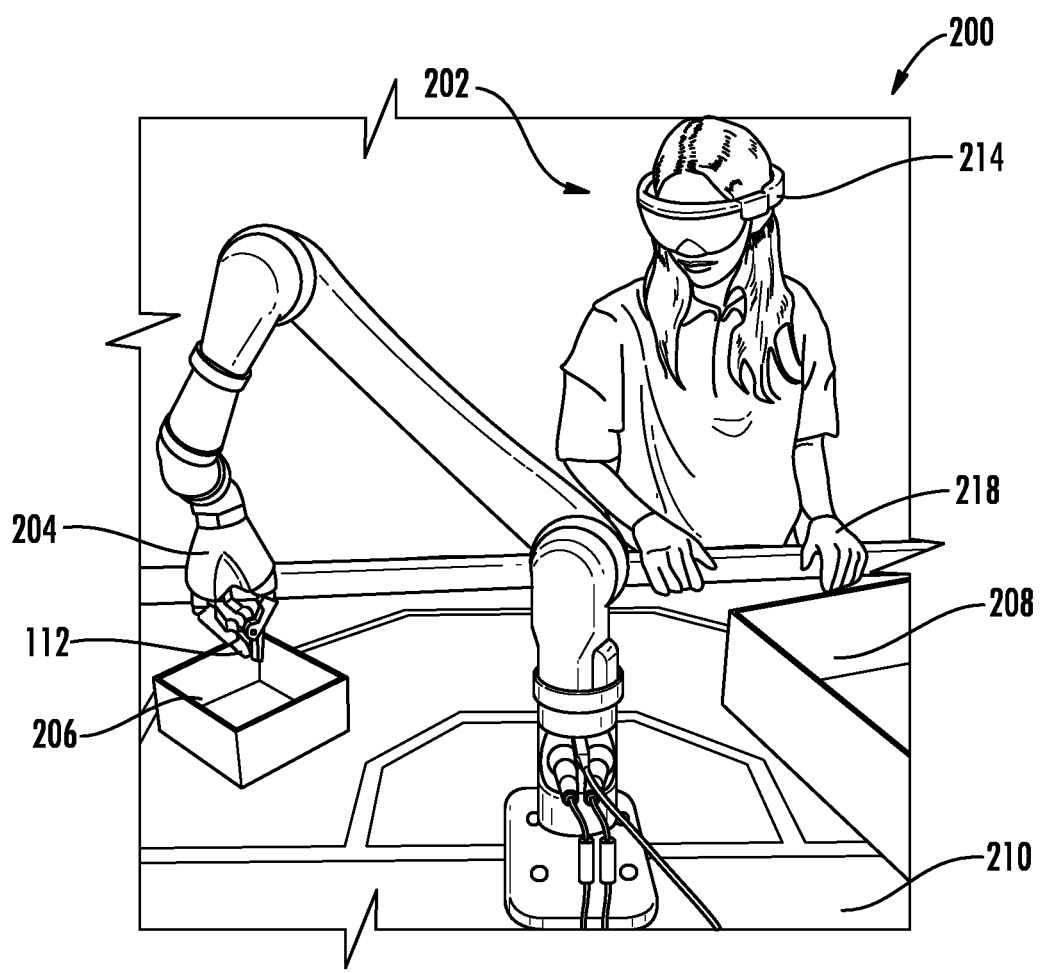
FIG. 2A is a perspective view of a teaching system implemented on the operator-robot environment according to another embodiment of the disclosure.
Figure 2B:
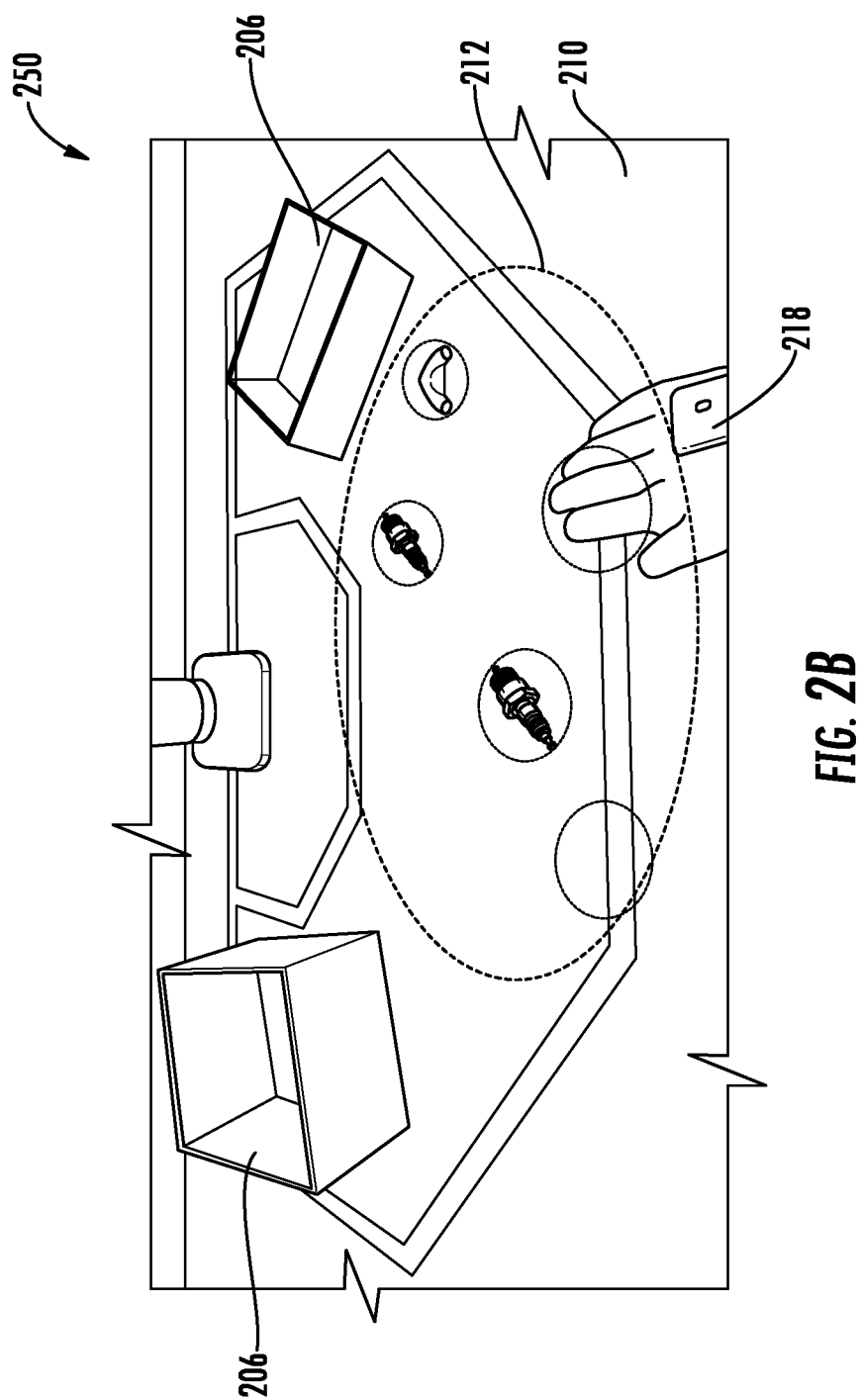
FIG. 2B is an example of an augmented reality view showing the teaching system of FIG. 2A.

FIGS. 2A and 2B illustrate a perspective view of a teaching system implemented on the operator-robot environment 200 and an example of an AR view 250 according to another embodiment of the disclosure, respectively. Unlike from FIG. 1A, the robot 204 for use on the operator-robot environment 200 is executing the task according to the teaching sequence or data of teaching commands previously stored or recorded in the non-transitory computer-readable storage media or machine-readable medium. During the operating of the robot 204, the operator 202 observes the learning result through the vision based AR device 214. If the learning result is consistent with the recorded teaching sequence or data of teaching commands, no changes is required. If, however, the learning result requires some upgrades or modifications, at least a portion of the recorded teaching sequence performed by the robot 204 is modified or altered. For example, the recorded teaching sequence includes pick, raise, left to right, and drop movement is now modified to include second pick and raise movements between left to right and drop movements. The visual based AR device 214 generates the visual view of the learning result of the recorded task or teaching sequence, visually corrects the robot by overriding the recorded teaching sequence or task received by the controller, as illustrated in FIG. 2B. Depending on the application, the entire or majority of the previously recorded teaching sequence or data of teaching commands may be wholly or partially replaced, modified, updated, or altered.

Figure 3:
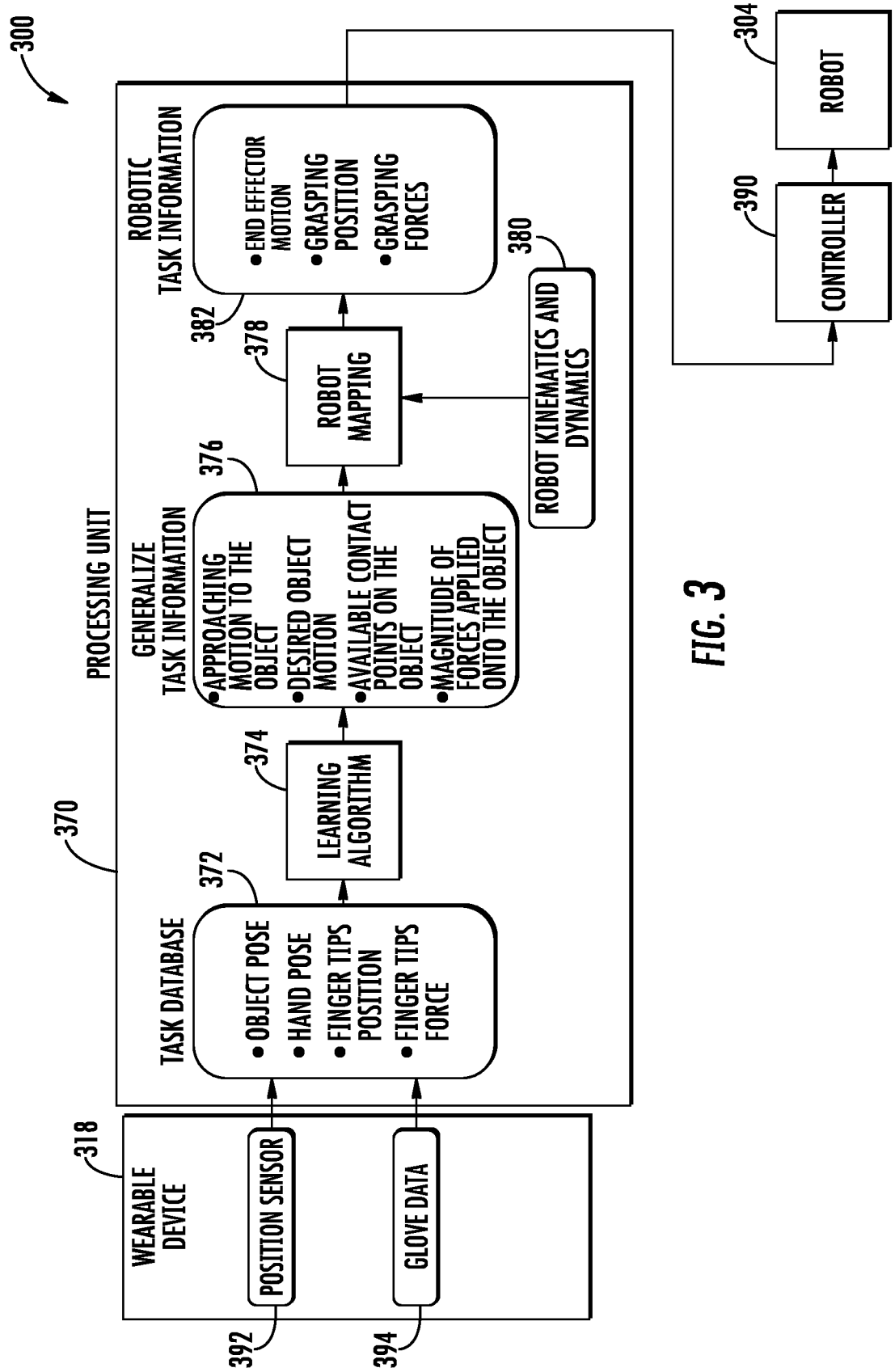
FIG. 3 is a schematic block diagram of a robot teaching system according to an embodiment of the disclosure.

FIG. 3 is a schematic block diagram of a robot teaching system 300 according to an exemplary embodiment of the disclosure. The system 300 includes one or more processors 370 communicatively coupled a wearable device 318 to a controller 390 for controlling a robot 304. A non-transitory computer-readable storage media 372 such as a memory for storing one or more programs is provided in the system 300. Alternatively, the non-transitory computer-readable storage media may be located remotely elsewhere outside the system 300. For example, the non-transitory computer-readable storage media 372 may be located on a cloud network or any suitable remotely wireless networks. The stored programs executed by the one or more processors 370 includes but not limited to instructions for detecting signals representing at least one movement, orientation, position, force, and torque of any part of a user's body with the wearable device 318, instructions for processing the detected signals, instructions for storing the processed signals defining as data of teaching commands, instructions for operating the robot 304 according to the data of teaching commands, and instructions for visually correcting the robot 304 during operation of the robot 304. The stored programs executed by the one or more processors further includes instructions for visualizing learning result and overriding the data of teaching commands received by the controller 390 during the operation of the robot 304. One or more sensing elements 392 for tracking, sensing, and detecting movement, orientation, position, force, and torque of any part of the user's body may be incorporated in the wearable device 318. In some examples, the wearable device 318 may include a dataglove 394 to determine human body or hand gesture.

A. Sensor Data: The sensor data is the data received from the object sensor and the wearable device. It includes but is not limited to movement, orientation, position, force, and torque of at least one user body part applied to the object. The sensor data also include the data received from the object sensor, e.g. the position, orientation, type or class of the object.

B. Teaching algorithm—It is the main process of the processing device. It applies mathematical transformations and algorithms to generalize the sensor data information into teaching commands.

C. Teaching Commands—The teaching commands are the result of the computations of the teaching algorithm. They describe the demonstrated task with an object centric representation that include but are not limited to the lifting motion, holding motion, placing motion, strength of grasp, object interaction force, object pose, and motions performed by the operator. These teaching commands are independent of the hardware used for sensing and independent of the controller and the robot. The teaching commands are stored in the memory.

D: Controller 378—The controller is a robot-specific hardware with limited processing capabilities. It receives the teaching commands and adapts them according to the current signal coming from the object sensor. The controller operates the robot directly. The user is allowed to override the teaching command using the input vision device.

E: Robot kinematics and dynamics 380—Deleted from the workflow.

F: Robotic Task Information 382—Deleted from the workflow.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hard-wired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Figure 4:
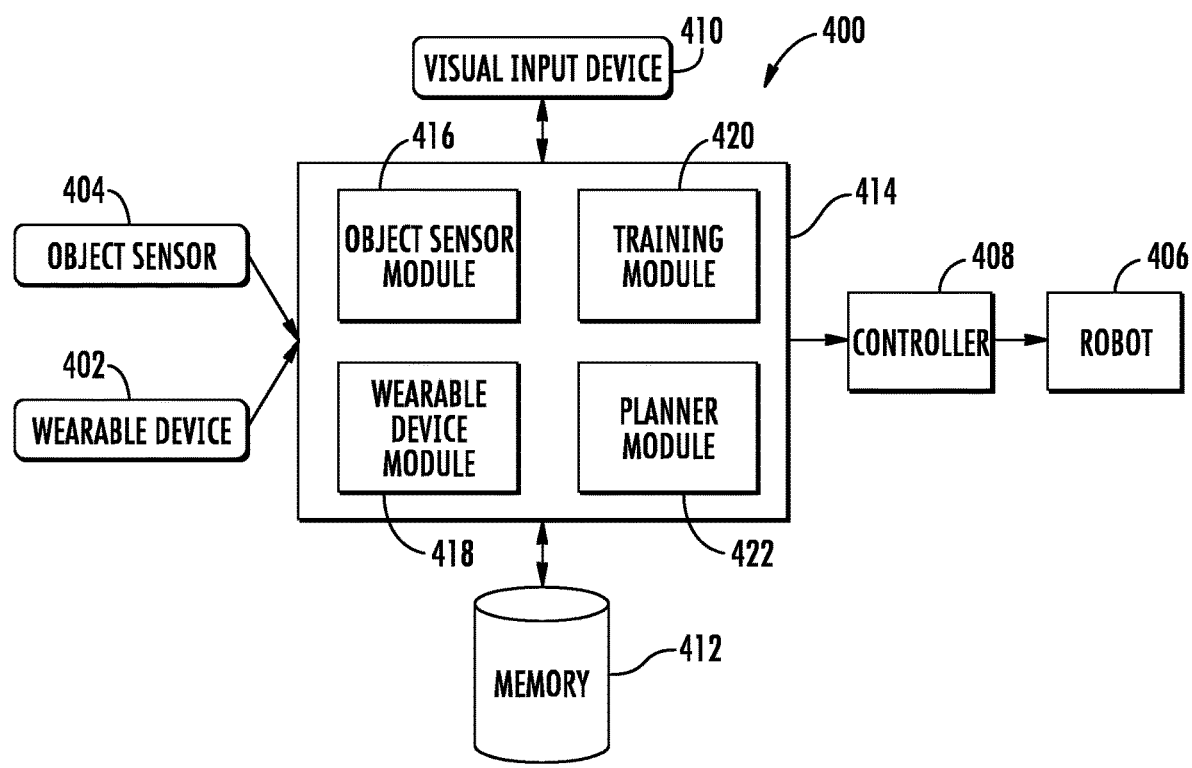
FIG. 4 is a schematic block diagram of a robot teaching system according to another embodiment of the disclosure.

FIG. 4 is a schematic block diagram of another exemplary embodiment of a robot teaching system 400 according to the disclosure. The system 400 includes a wearable device 402, an object sensor 404, a robot 406, a robot controller 408, a user input device 410, a memory 412 and a processing device 414.

The wearable device 402 is a device worn by the user, such as a glove, wrist device, ring, patch, and the like, which is configured to track or detect movement, orientation, position, force, torque, or combination thereof of a body or a part of the body, such as arm, a hand, a finger, or a palm of the user. The wearable device 402 includes one or more sensing elements for sensing or tracking movement, orientation, position, force, or torque of the arm, hand, finger, or palm of the user. Examples of sensing or tracking elements for determining the movement, orientation, position, force, or torque are motion sensing, position sensing, magnetic sensing, accelerometers, gyroscopes, global positioning system (GPS), inertial sensing, pressure sensing, or any suitable sensing and tracking technologies.

The system includes at least one object sensor 404 for sensing physical characteristics of the learning environment or workspace and providing sensor output to the processing device. The sensor output is used by the system to identify and distinguish objects in the learning environment. Any suitable type and number of sensors may be used to provide input to the system, including optical sensors, proximity sensors, accelerometers, pressure sensors, temperature sensors, and the like.

A robot 406 is an electromechanical device designed to perform one or more types of tasks with little to no intervention from a human operator. Some robots include a plurality of rigid parts which are connected by motorized joints that form limbs can be moved in a controlled, articulated manner. Robots may also be equipped with mechanisms that enable autonomous movement from one place to another, e.g., using wheels, treads, legs, wings, propellers, etc. Robot limbs may be provided with a variety of different types of mechanisms and/or tools for performing different types of tasks. Robots may also be provided with one or more sensors for sensing one or more physical properties of the environment in which the robot is located for control purposes.

The robot controller 408 is an electrical device with processing capability that is configured to receive high level commands, e.g., teaching commands, from the processing device 414 to perform a specific task and translate the commands into low level command sequences for the actuators of the robot 406 which cause the robot to perform the specific task. The robot controller 408 may receive sensor input, e.g., from the object sensor 404 and/or robot 406 sensors, to facilitate control and command generation for the robot. The controller 408 operates the robot directly.

The system 400 includes at least one input device 410 which enables the user to interact with the system. In one embodiment, the input device 410 is a visual input device, e.g., smart glasses, for visualizing learning results either before, during, or after the operation of the robot 406. The vision input device 410 may be a contact lens, smart glasses, smart goggles, or a head-mounted display worn by the user. In some embodiments, the vision input device 410 may comprise a vision-based augmented reality (AR) system configured to visualize learning result, override teaching commands received by a controller, and visually correct the operation of the robot.

The memory 412 is a non-transitory computer-readable storage media for storing program instructions which are executed by the processing device 414 as well as process data which is used by processing device 414 to implement the various functions of the system. The stored programs executed by the processing device 414 include but are not limited to instructions for detecting signals representing at least one movement, orientation, position, force, and torque of any part of a user's body with the wearable device 402, instructions for processing the detected signals, instructions for storing the processed signals defining as data of teaching commands, instructions for operating the robot 406 according to the data of teaching commands, and instructions for visually correcting the robot 406 during operation of the robot. The stored programs executed by the processing device further include instructions for visualizing learning result and overriding the data of teaching commands received by the controller 408 during the operation of the robot 406. The system memory 412 can be any suitable type of memory, including solid state memory, magnetic memory, or optical memory, just to name a few, and can be implemented in a single device or distributed across multiple devices.

The processing device 414 is the main component of the system 400 and is responsible for a number of key aspects of the system including receiving and processing sensor data (from object sensor and wearable device), learning the task from the operator by direct demonstration, planning the execution of the learned task, communicating teaching commands to the robot controller, receiving operator feedback and interacting with the user via the visual input device. The processing device 414 includes at least one processor, such as a central processing unit (CPU), an application specific integrated circuit (ASIC), a field programmable gate array (FPGA) device, or a micro-controller, that is configured to execute programmed instructions that are stored in the memory 412.

To implement the functionality of the system, the processing device 414 is composed of four sub-modules. Each sub-module has a specific input/output which is received/sent by another sub-module of the processing device, an external device or a memory unit. These sub-modules include an object sensor module 416, a wearable device module 418, a training module 420, and a planner module 422. As used herein, the terms "module" and "sub-module", refer to any known or later developed hardware, software, firmware, artificial intelligence, fuzzy logic, or combination of these that is capable of performing the functionality associated with that element. The module or sub-module encapsulates related functions and provides clearly defined interfaces for receiving input, transmitting output and accessing functions of the module.

Figure 5:
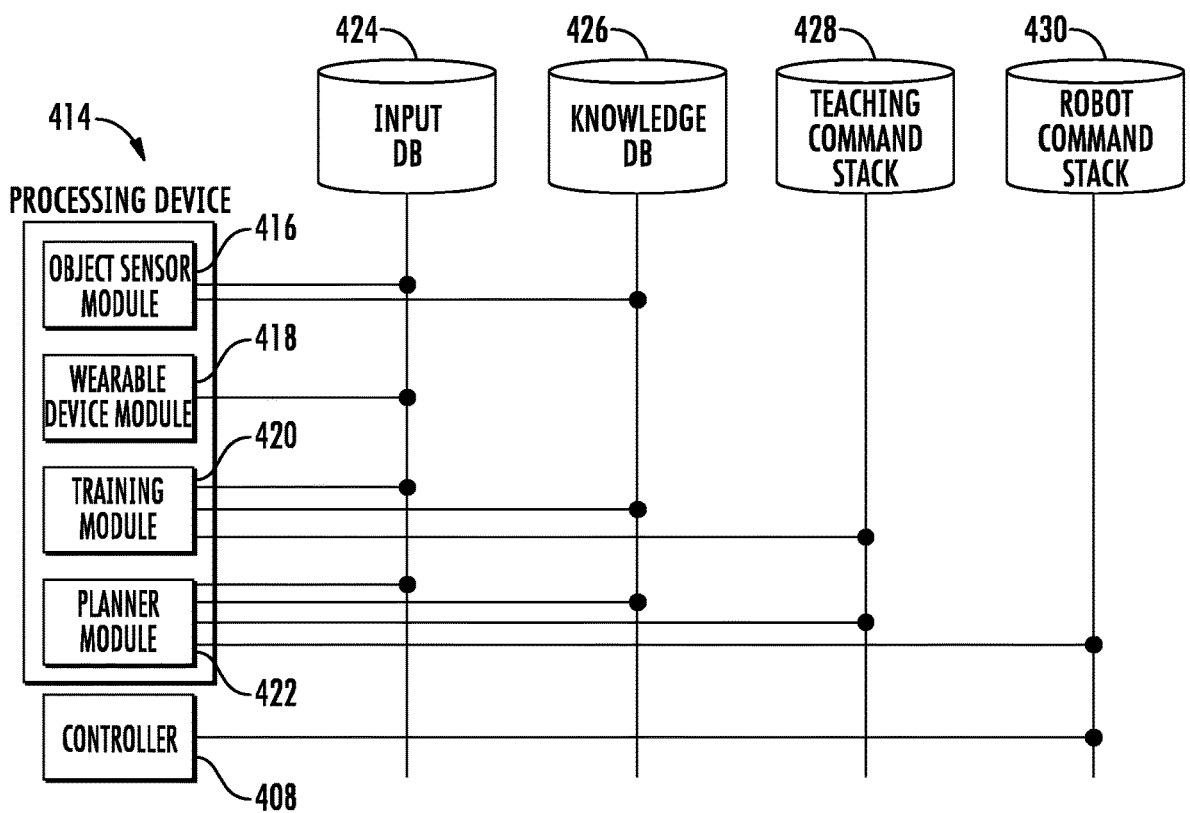
FIG. 5 is a block diagram of the data flow of the system of FIG. 4.

FIG. 5 depicts the information flow between the different sub-modules of the processing device 414 and the robot controller 408 through memory units. These memory units may be implemented in the system memory and/or may be internal or external to the processing device. Any suitable data structure or memory storage structure may be used to store the data for the sub-modules. As depicted in FIG. 5, the data stored in the memory units may be organized in the form of a database (e.g., querying a unique "key", the information associated to the key is retrieved) or a stack (an ordinated list of entries).

Referring to FIG. 5, the object sensor module 416 is responsible for distinguishing and identifying objects in the learning environment. To this end, the object sensor module 416 receives sensor data corresponding to the sensor output from the object sensor 404 and processes the sensor data to identify the objects in the workspace. The data pertinent to the object sensor module 416 is stored in an Input DB 424. In one embodiment, the object sensor module 416 assigns a unique identifier (e.g., object_ID, FIG. 6) to each identified object. The object sensor module 416 then accesses Knowledge DB 426 to determine a type or classification for the object. The object identifier and type information is then stored in Input DB 424 along with other pertinent data, such as position and orientation data from the sensors. The object sensor module 416 is configured to use the sensor output to track identified objects and to update Input DB 424 with current information.

The object sensor module processes the data coming from the object sensor connected to the system. It is responsible for identifying the objects and track their position and orientation in the workspace. When a new object is introduced in the workspace, the object sensor module identifies it by assigning a unique object_ID and a type_ID to it. Hence, a new entry in the Input DB is created and instantiated with these Ids. The object_ID is a unique key of the Object DB and used to store and access information regarding the object status and properties. The type_ID is used as unique key of the Knowledge DB to index an object library collecting the characteristics of the different types of objects such as geometrical and dynamical properties. At each iteration of the algorithm, the position and orientation of the objects which are in the workspace are computed using the sensor data of the object sensor. The pose of each object is stored in the Input DB at the corresponding object_ID entry.

Figure 6:
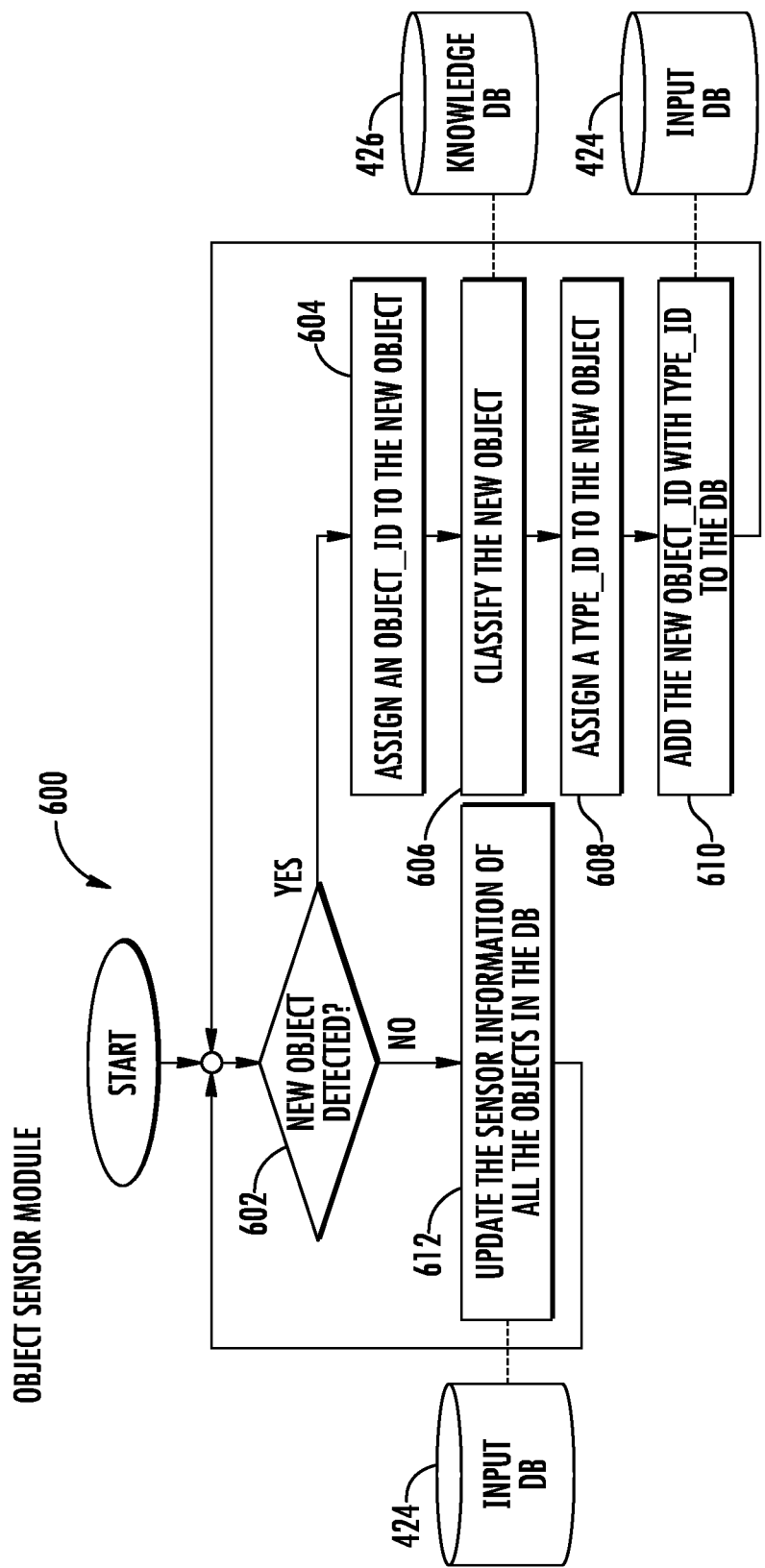
FIG. 6 is a flowchart of a process implemented by the object sensor module of the system of FIG. 4.

FIG. 6 is a flowchart of an embodiment of an algorithm implemented in the object sensor module. The process starts at block 600. The object sensor data is processed to determine if the sensor data pertains to a new object or to a previously identified object (block 602). If the sensor data indicates a new object is detected in the workspace, a unique identifier (object_ID) is assigned to the new object (block 604). The object sensor module then accesses the Knowledge DB 426 to classify the new object (block 606). Based on the information in Knowledge DB 426, the object sensor module assigns a type identifier (type_ID) to the new object (block 608). The new object information (e.g., object_ID, type_ID and sensor data) is then stored in the Input DB 424 (block 610). If the sensor data pertains to a previously identified object, the sensor data pertaining to that object is updated in Input DB 424 (block 612).

Referring again to FIG. 5, the wearable device module 418 is configured to interact with the wearable device(s) 402 in a manner similar to the manner in which the object sensor module 416 interacts with the object sensor(s) 404. The wearable device module 418 maintains information in Input DB 424 pertaining to the wearable device(s). The wearable device module 418 assigns a unique identifier (e.g., wearable_device_ID, FIG. 7) to each wearable device connected to the system. The wearable device module 418 receives the output from the wearable device 402 and processes the data to determine the orientation, position, force, torque and the like of the user's body part. This information is then stored in Input DB 424 in association with the corresponding wearable device identifier. The wearable device module 418 monitors the output of the wearable device(s) 402 and updates the information in Input DB 424 accordingly.

The wearable device module 418 processes the data coming from the wearable device in order to track the position and orientation of the user's fingertips and the force and torque exerted by the user onto the objects in the workspace. When a new wearable device is connected to the system, the module assigns a unique wearable_device_ID to it. Hence, a new entry in the Input DB is created and instantiated with this ID. During iterations of the algorithm, the module collects the sensor data coming from the wearable devices acting in the workspace, processes them, and stores them into the Input DB at the corresponding wearable_device_ID entry.

Figure 7:
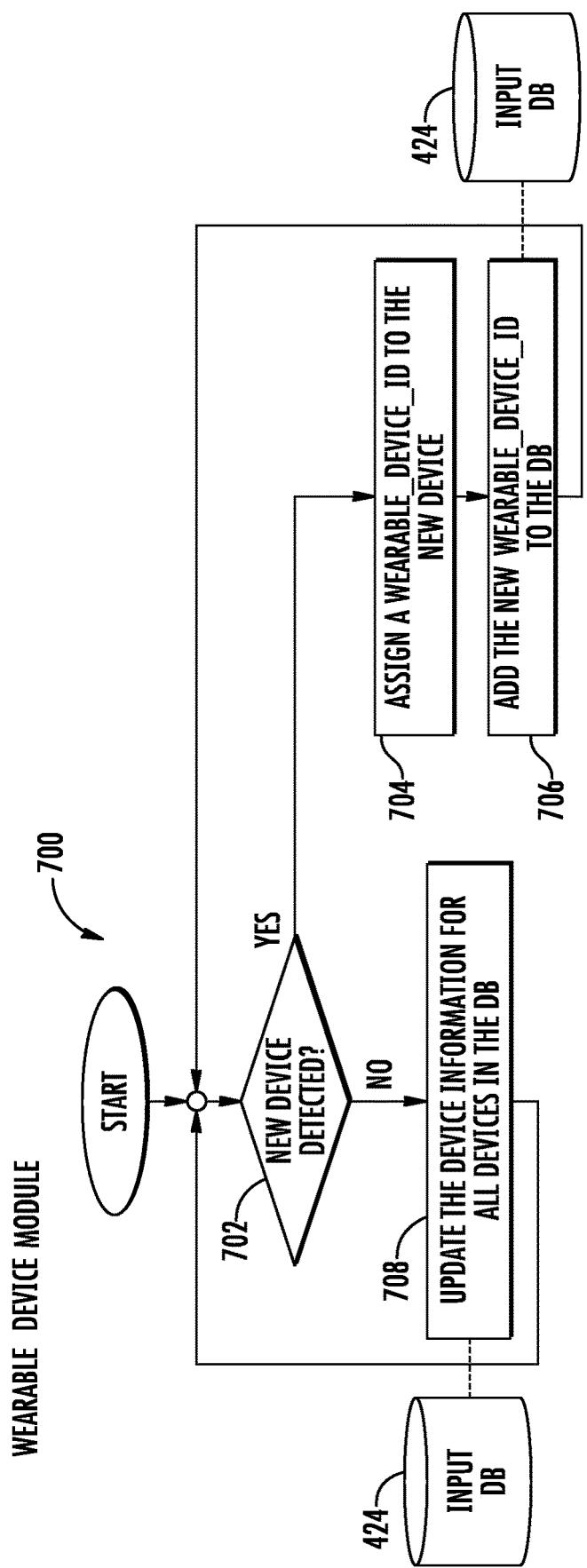
FIG. 7 is a flowchart of a process implemented by the wearable device module of the system of FIG. 4.

FIG. 7 is a flowchart of an embodiment of a process implemented in the wearable device module 418. The process starts at block 700. Wearable device data is processed to determine if the data pertains to a new wearable device to a previously identified device (block 702). If the device data indicates a new device is detected, a unique identifier (wearable_device_ID) is assigned to the new device (block 704). The new device information (e.g., wearable_device_ID and device output) is then stored in the Input DB 424

(block 706). If the device data pertains to a previously identified device, the device data pertaining to that device is updated in Input DB 424 (block 708).

Returning to FIG. 5, the training module 420 is configured to learn the task from the user which is to be implemented by the robot 406. The training module 420 has access to the data in Input DB 424 including the object sensor output and wearable device output. The training module 420 also has access to Knowledge DB 426 which contains a list of teaching command templates. The training module 420 is configured to generate a sequence of teaching commands by selecting the appropriate teaching command templates with reference to the object sensor data and wearable device data from Input DB 424 to implement the user's demonstrated task. This sequence of teaching commands is saved in the Teaching Command Stack 428 as an ordinated list of instantiated teaching commands.

Figure 8:
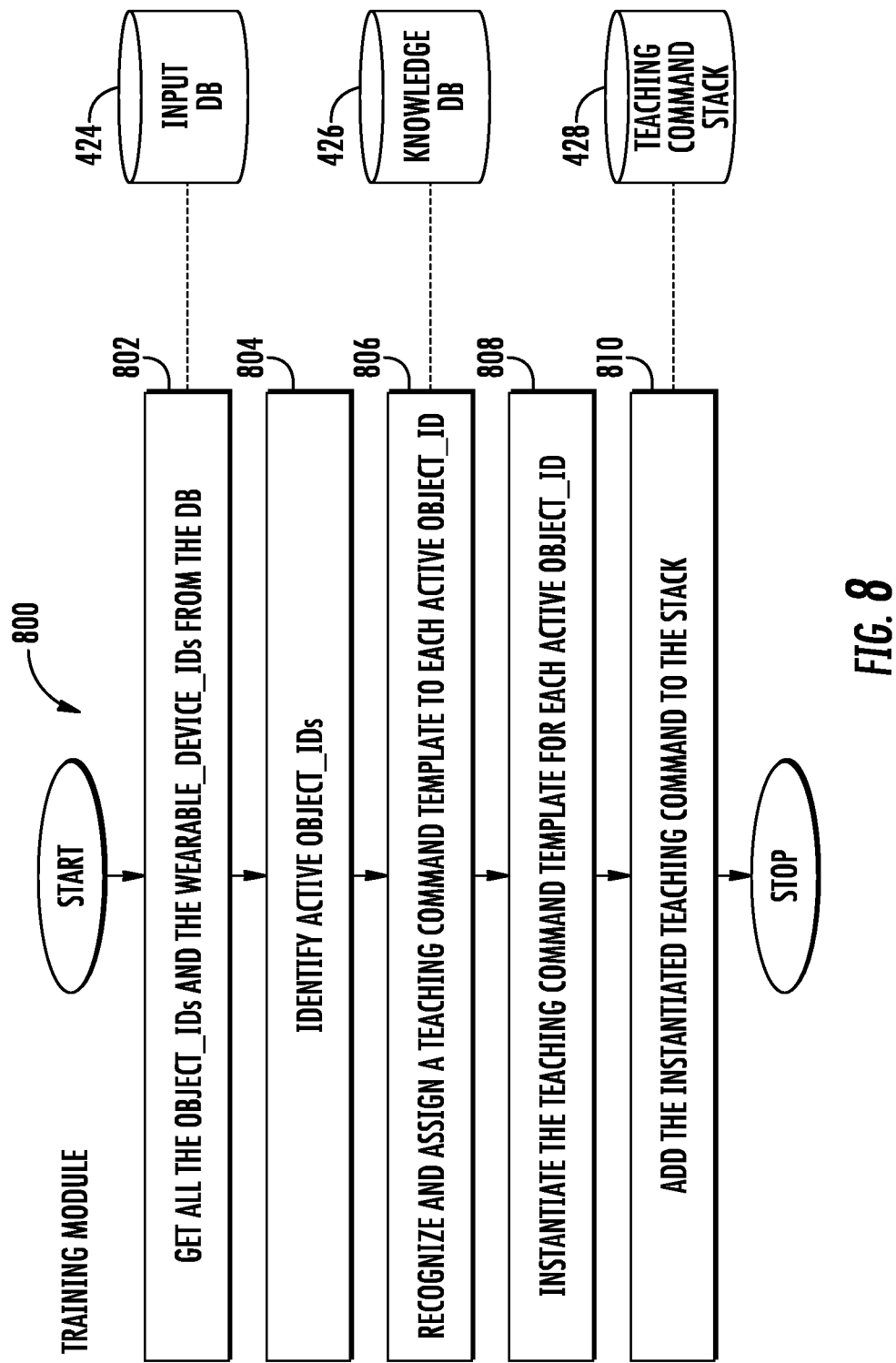
FIG. 8 is a flowchart of a process implemented by the training module of the system of FIG. 4.

FIG. 8 is a flowchart of an embodiment of a process for implementing the functionality of the training module 420. This module is responsible for learning the task from the operator by direct demonstration. To this aim, an object-centric representation is used to describe the task. The process starts at block 800. The training module 420 queries Input DB 424 to receive the object_Ids and wearable_device_Ids in the workspace as well as the sensed data pertaining to the objects and device (block 802). Once this information is received, the training module is aware of the current state of the workspace including the position, orientation, and type of the objects, position and orientation of the fingertips of the user, and corresponding force and torque applied by the user hand to the objects.

The training module then identifies any active objects (object_IDs) in the workspace (block 804). An object is considered "active" when the user is executing an action on it. Examples of user actions include approaching the object, grasping the object, lifting the object, moving the object and so on. The training module accesses Knowledge DB 426 and to selects a teaching command template pertaining to each active object and assigns the selected teaching commands to the corresponding active object (block 806). The training module selects the teaching command template that best describe the action which the user is currently executing on the active object.

With reference to the sensor information stored in the input_DB 424, the training module 420 instantiates the selected template for each active object (block 808). This results in an ordinated list of teaching commands. An instantiated teaching command template (or simply a teaching command) describes a specific action on the object such as the object being moved from a specific initial position to a specific final position or the object being grasped in a specific configuration and with a specific force. Finally, the teaching module adds the instantiated teaching commands to the Teaching Command Stack 430 (block 810).

Referring to FIG. 5, the planner module 422 has access to Input DB 424, Knowledge DB 426, Teaching Command Stack 428 and Robot Command Stack 430. The planner module 422 is configured to translate the sequence of instantiated teaching commands stored in the Teaching Command Stack 428 into a sequence of robot commands using the information contained in the Knowledge DB 426. The robot commands are then instantiated according to the objects that are currently registered in the Input DB 424. Finally the resulting list of instantiated robot commands is stored in the Robot Command Stack 430.

Figure 9:
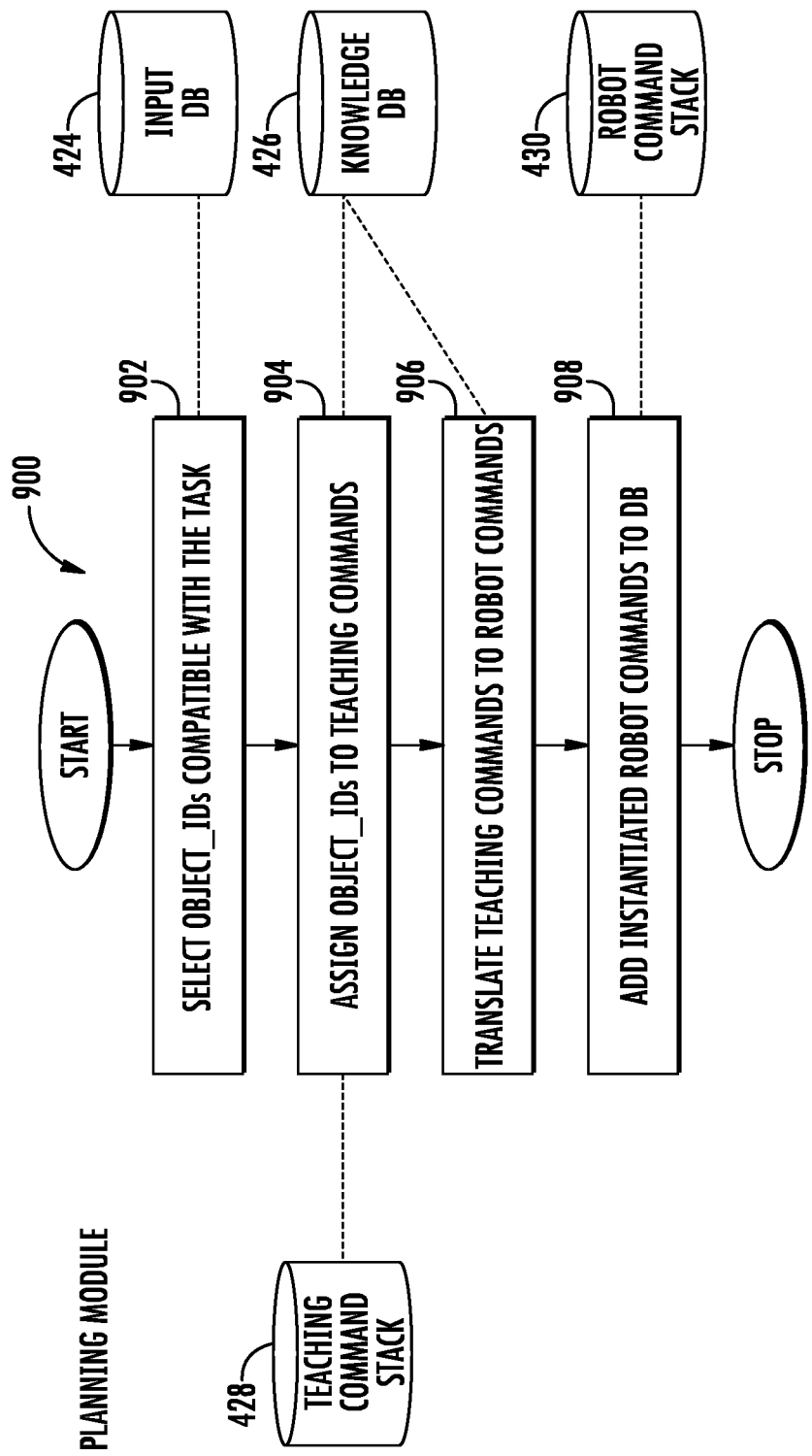
FIG. 9 is a flowchart of a process implemented by the planning module of the system of FIG. 4.

FIG. 9 is a flowchart of an embodiment of a process for implementing the functionality of the planning module. The planning module translates the learned task, described in object-centric representation, to a sequence of robot commands executable on the robot using the controller. The process starts at block 900. The robotic task is planned according to the objects which are currently in the workspace. To this end, the planning module begins by selecting the objects in the workspace that are pertinent or compatible with the task to be implemented (block 902). By querying the Input DB 424, the planning module is able to get the position, orientation, and type of the objects located in the workspace.

The planning module 422 assigns the objects to the teaching commands stored in the stack (block 904). The planning module then translates the teaching commands into robot commands (block 906). For each teaching command template, the Knowledge DB contains instructions on how to convert the corresponding teaching command (a single action expressed in object-centric representation) to a set of robot commands. A robot command is a parametrized low-level control command that can be executed by the controller. Hence, for each teaching command of the Teaching Command Stack 428, the planning module instantiates the corresponding set of robot commands using the position and orientation of the associated object. The instantiated robot commands are then added to the Robot Command Stack 430 (block 908). To execute the task, the robot controller accesses the Robot Command Stack and executes the robot commands in sequence to perform the task which was previously demonstrated by the user.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A system for teaching a robot, the system comprising:
a wearable device having a plurality of sensors configured to sense at least one of a movement, an orientation, a position, a force, and a torque of a part of a user's body applied on a plurality of objects as the user demonstrates a task;
an object sensor to detect positions and orientations of the plurality of objects as the user demonstrates the task;
a processing device configured to (i) receive the at least one of the movement, the orientation, the position, the force, and the torque from the wearable device, (ii) receive the position and the orientation from the object sensor, (iii) identify each object in the plurality of objects that is interacted with during the task, (iv) assign a respective teaching command template to each object in the plurality of objects that is interacted with during the task, (v) generate teaching commands for the task by instantiating the respective teaching command template assigned to each respective object in the plurality of objects that is interacted with during the task, each teaching command describing an action executed with respect to one of the plurality of objects, and (vi) generate robot commands by translating each teaching command into a set of robot commands;
a controller configured to (i) receive the robot commands from the processing device and (ii) operate the robot according to the received robot commands; and
a visual input device communicatively coupled to at least one of the processing device and the controller, the visual input device being configured to (i) generate a visual view to the user of at least one of a movement, an orientation, a position, a force, and a torque from the robot in relation to the plurality of objects, and (ii) correct the robot during operation of the robot by overriding one of the robot commands received by the controller.

2. The system of claim 1, wherein the controller is configured to (i) receive the positions and the orientations of the plurality of objects and (ii) operate the robot according to the robot commands to perform the task.

3. The system of claim 2, wherein the controller is configured to operate the robot to at least one of shift, move, rise, and lower the robot closer to the one of the plurality of objects.

4. The system of claim 3 wherein the visual input device enables visualization of a learning result during operation of the robot.

5. The system of claim 4 wherein the processing device enables data transfer between the wearable device, the object sensor, visual input device, and the controller.

6. The system of claim 5 wherein the wearable device is one of a glove, a wrist device, a watch, and a ring.

7. The system of claim 5 wherein the visual input device is one of a contact lens, glasses, a goggle, and a head-mounted display.

8. The system of claim 1 wherein the at least one of the movement, the orientation, the position, the force, and the torque are stored on at least one of a computer readable medium and a cloud database.

9. The system of claim 1 wherein the actions defined by the teaching commands include at least one of an end-effector motion, a grasping motion, strength of grasp, an approaching motion to the object, a lifting motion, a holding motion, a throwing motion, and a waving motion.

10. The system of claim 1 wherein the plurality of sensors include at least one of force sensors, motion sensors, and position sensors.

11. A system for teaching a robot comprising:
a user interface having a plurality of sensors configured to (i) sense at least one of a movement, an orientation, a position, a force, and a torque of a part of a user's body applied on plurality of objects as the user demonstrates a task, and (ii) visualizing a learning result during operation of the robot;
a processing device configured to (i) receive the at least one of the movement, the orientation, the position, the force, and the torque from the input assembly, (ii) identify each object in the plurality of objects that is interacted with during the task, (iii) assign a respective teaching command template to each object in the plurality of objects that is interacted with during the task, (iv) generate teaching commands for the task by instantiating the respective teaching command template assigned to each respective object in the plurality of objects that is interacted with during the task, each teaching command describing an action executed with respect to one of the plurality of objectst, and (v) generate robot commands by translating each teaching command into a set of robot commands; and
a controller configured to (i) receive the robot commands from the processing device and (ii) operate the robot according to the received robot commands;
wherein the input assembly is configured to correct the robot during operation of the robot by overriding one of the robot commands received by the controller.

12. The system of claim 11 further comprising:
an object sensor configured to detect positions and orientations of the plurality of objects.

13. The system of claim 12 wherein:
the controller is configured to receive the positions and the orientations of the plurality of objects and operate the robot according to the robot commands to perform the task,
the controller is configured to operate the robot to at least one of shift, move, rise, and lower the robot closer to the one of the plurality of objects, and
the processing device enables data transfer between the input assembly, the object sensor, and the controller.

14. The system of claim 13 wherein the input assembly comprising:
a wearable device having a plurality of sensors configured to sense at least one of a movement, an orientation, a position, a force, and a torque of at least one of the user's hand, the user's finger, and the user's palm applied on the plurality of objects as the user demonstrates the task; and
a visual input device configured to (i) enable the visualization of the learning result and to correct the robot during operation of the robot.

15. The system of claim 14 wherein the wearable device is one of a hand glove, a finger glove, and a palm glove.

16. The system of claim 14 wherein the visual input device is one of a contact lens, glasses, and goggles.

17. A method of teaching a robot, the method comprising:
sensing, with an input device, at least one of a movement, an orientation, a position, a force, and a torque of at least one of a user's hand, the user's finger, and the user's palm applied on plurality of objects as the user demonstrates the task;
receiving, with a processing device, the at least one of the movement, the orientation, the position, the force, and the torque from the input device;
identifying, with the processing device, each object in the plurality of objects that is interacted with during the task;
assigning, with the processing device, a respective teaching command template to each object in the plurality of objects that is interacted with during the task;
generating, with the processing device, teaching commands for the task by instantiating the respective teaching command template assigned to each respective object in the plurality of objects that is interacted with during the task, each teaching command describing an action executed with respect to one of the plurality of objects;
generating, with the processing device, robot commands by translating each teaching command into a set of robot commands;
controlling, with a controller, a robot by receiving the robot commands and operating the robot according to the received robot commands; and
correcting, with the input device, the robot by overriding one of the robot commands received by controller during operation of the robot.

18. The method of claim 17 further comprising:
detecting positions and orientations of the plurality of objects.

19. The method of claim 18 further comprising:
receiving the positions and the orientations of the plurality of objects with the controller; and
operating the robot to perform the task according to the robot commands.

20. The method of claim 19 further comprising:
enabling visualization of a learning result with the input device during operation of the robot.

\* \* \* \* \*